(12) United States Patent
Lee et al.

(10) Patent No.: US 10,597,093 B2
(45) Date of Patent: Mar. 24, 2020

(54) DOUBLE SIDED CLIP WITH SEAL

(71) Applicant: FORD GLOBAL TECHNOLOGIES, LLC, Dearborn, MI (US)

(72) Inventors: Jeffery Lee, Tecumseh (CA); Martin D. Lopez, Jr., Sterling Heights, MI (US); David McCormick, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 14 days.

(21) Appl. No.: 15/670,015

(22) Filed: Aug. 7, 2017

(65) Prior Publication Data

US 2019/0039661 A1 Feb. 7, 2019

(51) Int. Cl.
| | |
|---|---|
| *B62D 27/06* | (2006.01) |
| *F16B 2/22* | (2006.01) |
| *F16B 21/08* | (2006.01) |
| *F16B 5/12* | (2006.01) |
| *B29C 65/58* | (2006.01) |
| *B29L 31/30* | (2006.01) |
| *B29C 65/00* | (2006.01) |
| *B29C 65/64* | (2006.01) |
| *F16B 1/00* | (2006.01) |
| *B60R 13/08* | (2006.01) |

(52) U.S. Cl.
CPC ............ *B62D 27/06* (2013.01); *F16B 2/22* (2013.01); *F16B 5/123* (2013.01); *F16B 21/082* (2013.01); *B29C 65/58* (2013.01); *B29C 65/64* (2013.01); *B29C 66/532* (2013.01); *B29C 66/55* (2013.01); *B29C 66/742* (2013.01); *B29L 2031/3002* (2013.01); *B29L 2031/3005* (2013.01); *B60R 13/08* (2013.01); *B60R 2013/0807* (2013.01); *F16B 2001/0092* (2013.01)

(58) Field of Classification Search
CPC ................................ B62D 27/06; F16B 2/22
See application file for complete search history.

(56) References Cited

U.S. PATENT DOCUMENTS

| | | | | |
|---|---|---|---|---|
| 3,651,545 | A * | 3/1972 | Hara ................. | F16B 21/082 174/138 D |
| 4,122,583 | A * | 10/1978 | Grittner ............ | B60R 13/0206 24/297 |
| 4,159,592 | A * | 7/1979 | Gabriel ............. | A63H 33/101 24/287 |
| 4,470,178 | A * | 9/1984 | Matsui ................. | F16B 5/065 174/138 D |

(Continued)

FOREIGN PATENT DOCUMENTS

CN 103115048 5/2013

*Primary Examiner* — Robert Sandy
*Assistant Examiner* — David M Upchurch
(74) *Attorney, Agent, or Firm* — David Coppiellie; Carlson, Gaskey & Olds, P.C.

(57) ABSTRACT

An apparatus, according to an exemplary aspect of the present disclosure includes, among other things, a clip body having a vehicle side and a panel side. A first clip is on the vehicle side and a second clip is on the panel side. A seal is on the vehicle side. A method according to an exemplary aspect of the present disclosure includes, among other things, attaching the first clip to a vehicle body, and subsequently attaching a panel to the second clip such that the seal is positioned between the clip body and the vehicle body.

25 Claims, 2 Drawing Sheets

(56) References Cited

U.S. PATENT DOCUMENTS

| | | | | |
|---|---|---|---|---|
| 4,495,380 | A | * | 1/1985 | Ryan ............... F16B 21/082 |
| | | | | 174/138 D |
| 4,524,494 | A | * | 6/1985 | Sato ............... F16B 21/082 |
| | | | | 174/138 D |
| 4,629,356 | A | * | 12/1986 | Hayashi ............ F16B 5/065 |
| | | | | 174/138 D |
| 4,635,326 | A | * | 1/1987 | Yagi ............... F16B 5/0614 |
| | | | | 174/138 D |
| 4,644,614 | A | * | 2/1987 | Mizusawa .......... F16B 5/0607 |
| | | | | 174/138 D |
| 4,901,204 | A | * | 2/1990 | Hayashi ............ F16B 5/0607 |
| | | | | 174/138 D |
| 5,039,040 | A | * | 8/1991 | Idjakiren .......... F16B 21/086 |
| | | | | 24/297 |
| 5,191,513 | A | | 3/1993 | Sugiura et al. |
| 5,217,337 | A | | 6/1993 | Junemann et al. |
| 6,042,296 | A | | 3/2000 | Wittig et al. |
| 6,581,252 | B1 | * | 6/2003 | Sedlock ............ F16B 5/065 |
| | | | | 24/297 |
| 6,952,863 | B2 | * | 10/2005 | Draggoo ........... B60R 13/0206 |
| | | | | 24/297 |
| 7,073,231 | B2 | * | 7/2006 | Draggoo ........... B60R 13/0206 |
| | | | | 24/297 |
| 7,351,023 | B2 | | 4/2008 | Scroggie et al. |
| 7,698,787 | B2 | | 4/2010 | Scroggie et al. |
| 2011/0010898 | A1 | * | 1/2011 | Scroggie ........... B60R 13/04 |
| | | | | 24/292 |

* cited by examiner

DOUBLE SIDED CLIP WITH SEAL

TECHNICAL FIELD

This disclosure relates to an exemplary apparatus and method of providing a double-sided clip with a seal for connecting a panel to a vehicle body in a sealed manner.

BACKGROUND

Vehicles include various body panels and fascia that are attached to a vehicle body structure. In one known example, the body panel or fascia includes one or more clips or pins that are inserted through openings in the vehicle body structure to attach the panel or fascia to the vehicle. Often the assembly process comprises a blind installation where it is difficult to determine whether the clips have been properly installed. Further, the connection point at the clip becomes a potential path for water to leak into the vehicle body.

SUMMARY

An apparatus according to an exemplary aspect of the present disclosure includes, among other things, a clip body having a vehicle side and a panel side. A first clip is on the vehicle side and a second clip is on the panel side. A seal is on the vehicle side.

In a further non-limiting embodiment of the foregoing apparatus, the apparatus includes at least one locator pin on the panel side.

In a further non-limiting embodiment of either of the foregoing apparatus, the at least one first clip comprises at least a pair of first clips.

In a further non-limiting embodiment of any of the foregoing apparatus, the clip body, the pair of first clips, the second clip, and the locator pin are formed as a single-piece component.

In a further non-limiting embodiment of any of the foregoing apparatus, the seal comprises a layer of foam positioned between the vehicle side of the clip body and a vehicle body structure configured to be attached to the first clip.

In a further non-limiting embodiment of any of the foregoing apparatus, the seal surrounds bases of the first clips.

In a further non-limiting embodiment of any of the foregoing apparatus, the at least one first clip comprises at least a pair of W-clips.

In a further non-limiting embodiment of any of the foregoing apparatus, the at least one second clip comprises a W-clip.

In a further non-limiting embodiment of any of the foregoing apparatus, the clip body comprises a flat plate with the first clip extending outwardly of the vehicle side and the second clip extending outwardly of the panel side.

An apparatus according to another exemplary aspect of the present disclosure includes, among other things, a vehicle body structure, a panel to be attached to the vehicle body structure, and at least one connector to attach the panel to the vehicle body structure. The connector comprises a clip body having a vehicle side and a panel side, at least one first clip extending from the vehicle side, at least one second clip extending from the panel side, and a seal on the vehicle side.

In a further non-limiting embodiment of any of the foregoing apparatus, the clip body comprises a flat plate and the first and second clips comprise W-clips.

In a further non-limiting embodiment of any of the foregoing apparatus, the apparatus includes a locator pin extending from the panel side to locate the panel relative to the vehicle body structure.

In a further non-limiting embodiment of any of the foregoing apparatus, the at least one first clip comprises at least a pair of first clips.

In a further non-limiting embodiment of any of the foregoing apparatus, the seal comprises a layer of foam that surrounds bases of the first clips.

In a further non-limiting embodiment of any of the foregoing apparatus, each of the first and second clips have at least a pair of opposing fingers that collapse during insertion through corresponding holes in the vehicle body structure and panel, and expand after insertion to prevent removal of the panel from the vehicle body structure.

A method according to another exemplary aspect of the present disclosure includes the steps of, among other things: (a) providing a clip body having at least one first clip on a first side, a second clip on a second side, and a seal on the first side; (b) attaching the first clip to a vehicle body; and (c) subsequently attaching a panel to the second clip such that the seal is positioned between the clip body and the vehicle body.

In a further non-limiting embodiment of the foregoing method, the at least one first clip comprises a least a pair of first clips, and the method includes inserting the pair of first clips through corresponding openings in the vehicle body during step (b).

In a further non-limiting embodiment of either of the foregoing methods, the clip body includes a locating pin on the second side, and the method includes inserting the locator pin through a locating opening in the panel during step (c).

In a further non-limiting embodiment of any of the foregoing methods, the method includes providing the seal as a layer of foam that surrounds bases of the first clips.

In a further non-limiting embodiment of any of the foregoing methods, the method includes molding the clip body and the first and second clips as a single-piece component.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of providing a double-sided clip with a seal for connecting a panel to a vehicle body in a sealed manner.

Figure 1:
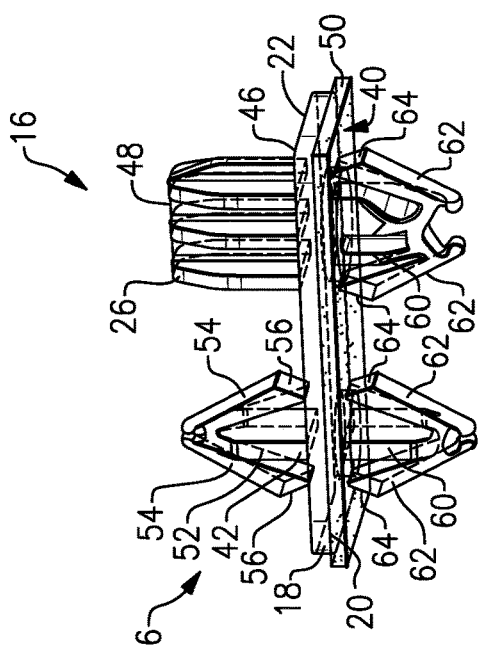
FIG. 1 illustrates a side view of a clip incorporating the subject invention and as connecting a panel or fascia on a vehicle body.
Figure 2:
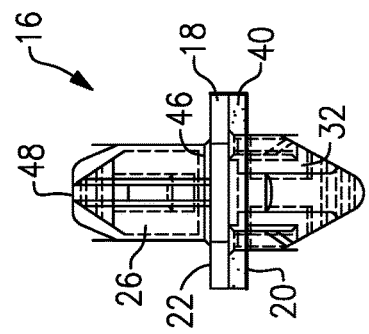
FIG. 2 is an end view of the clip of FIG. 1.

As shown in FIG. 1, a vehicle 10 includes a body structure 12 to which a body panel or fascia 14 is attached. One or more clips 16 are used to attach the fascia 14 to the body structure 12. In one example, the body structure 12 comprises sheet metal and the fascia 14 comprises a plastic panel or trim piece. Each clip 16 has a clip body 18 with a sheet metal or vehicle side 20 and an opposing trim or panel side 22.

The clip 16 is shown in greater detail in FIGS. 2-6. The panel side 22 of the clip body 18 has at least one first clip 24 and at least one locator pin 26. The first clip 24 fits through a first opening 28 in the panel 14 and the locator pin 26 fits through a second opening 30 in the panel 14. The vehicle side 20 has at least one second clip 32 that fits through an opening 34 in the vehicle body structure 12. In one example, the vehicle side 20 includes a pair of second clips 32 that fit through corresponding openings 34 in the vehicle body structure 12. Thus, the clip 16 comprises a double sided clip that can be easily snapped into openings in the panel 14 and body structure 12. This will be discussed in greater detail below.

Figure 3:
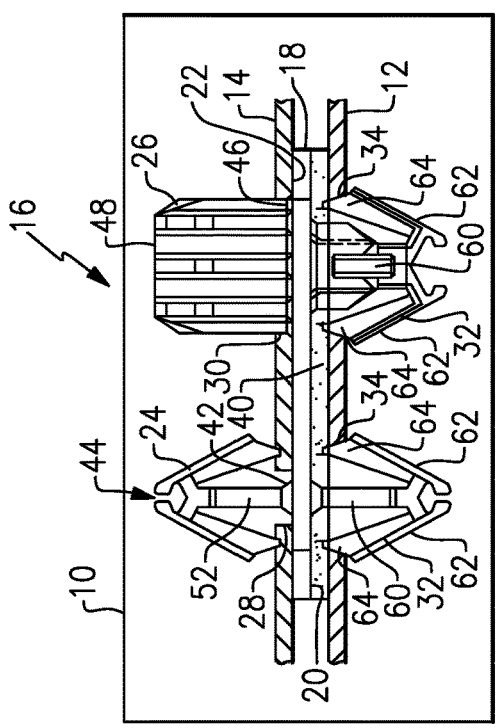
FIG. 3 is a side perspective view of the clip of FIG. 4.
Figure 6:
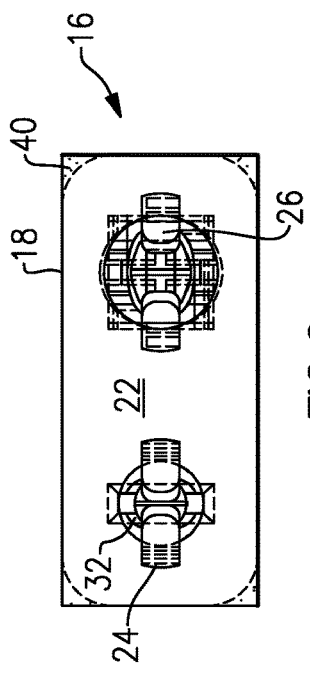
FIG. 6 is a top view of the clip of FIG. 1.
Figure 4:
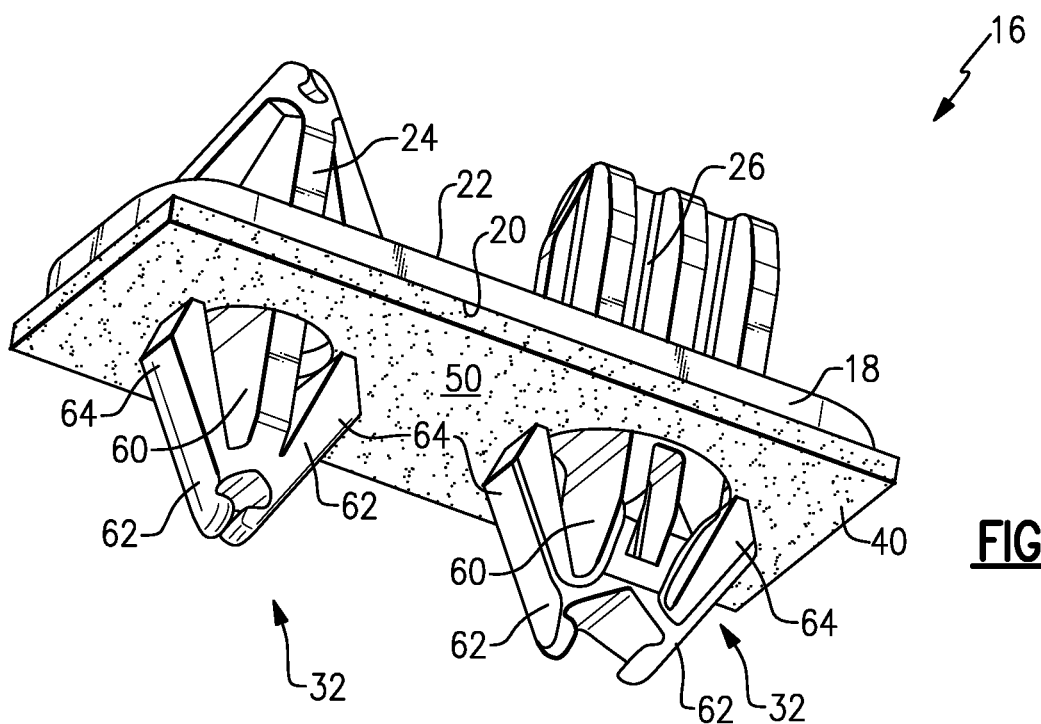
FIG. 4 is a perspective view of the clip of FIG. 1 as viewed at a vehicle side.
Figure 5:
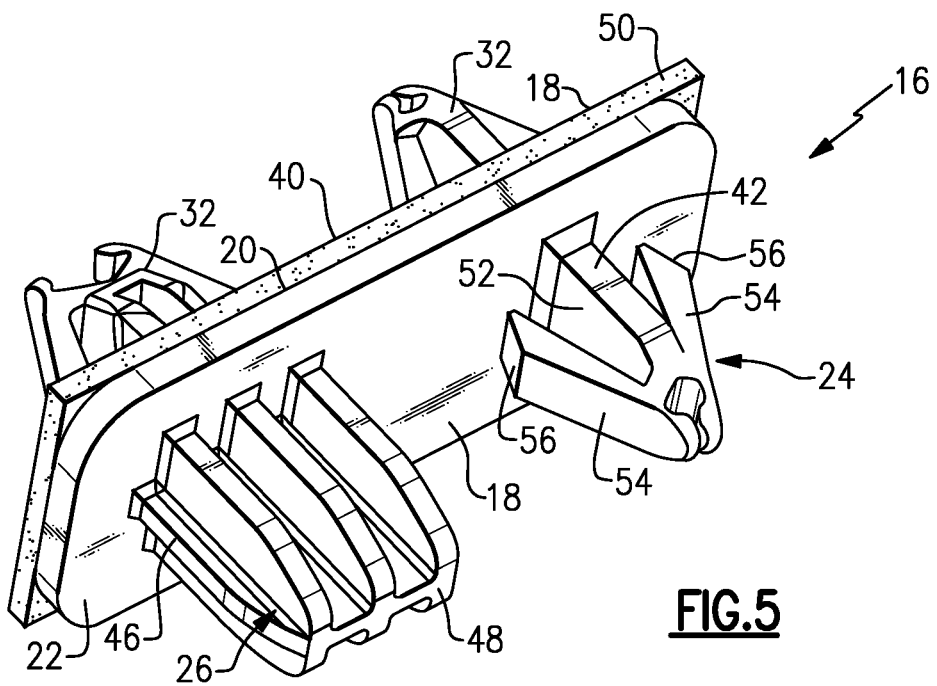
FIG. 5 is a perspective view of the clip of FIG. 1 as viewed at a panel or fascia side.

Each clip 16 includes a sealing feature or seal 40 on the panel vehicle side 20 as best shown in FIG. 3. In one example, the clip body 18 comprises a flat plate that defines the panel 22 and vehicle 20 sides. The first clip 24 extends outwardly from the panel side 22 from a clip base 42 to a distal tip 44. The locator pin 26 extends outwardly from the panel side 22 from a pin base 46 to a distal tip 48. In one example, the seal 40 comprises a layer 50 of sealant material that rests on, or is attached to, the vehicle side 20 and completely surrounds bases of the second clips 32. As such, when the clip 16 is used to connect the panel 14 to the body structure 12, a completely sealed interface is provided such that water cannot pass through the aligned openings 28, 30, 34.

In one example, the clip body 18, the first clip 24, the locator pin 26, and the second clips 32 are all integrally formed as a single piece component. In one example, the single-piece clip 16 is injected molded from a plastic material; however, other manufacturing process and materials could also be used. Once the clip 16 has been formed as a single-piece component, the seal 40 can then be applied to the vehicle side 20. In one example, the sealant material comprises a foam based material; however, other types of sealant material could also be used.

First, the clip 16 is attached to the vehicle body structure 12 by inserting the second clips 32 into the body structure 12. Next, the fascia or panel 14 is located relative to the body structure 12 via the locator pin 26 and panel second opening 30. The panel 14 is then attached or connected to the body structure 12 by pushing the first opening 28 of the panel 14 over the first clip 24. This secures the panel 14 to the body structure such that the seal 40 is positioned between the clip body 18 and an outer surface of the body structure 12 in a completely sealed manner.

In one example, the first 24 and second 32 clips comprise first and second W-clips. As shown in FIG. 3, the first W-clip 24 includes a center stem portion 52 that connects to the panel side 22 of the clip body 18 to form the clip base 42. The first W-clip 24 also includes a pair of opposing fingers 54 that are connected to a distal end of the stem 52 and that are tapered or angled relative to the stem 52 such that ends 56 of the fingers 54 are spaced apart from and unattached to the stem 52 by a gap such that the fingers 54 and stem portion 52 form a W-shape. This allows the ends 56 of the fingers 54 to collapse inwardly toward the stem 52 during insertion through the first opening 28 in the panel 14, and then subsequently expand or snap back after insertion to prevent removal of the panel 14 from the vehicle body structure 12.

As shown in FIGS. 1 and 3, each second W-clip 32 includes a center stem portion 60 that connects to the vehicle side 20 of the clip body 18. The second W-clips 32 also each include a pair of opposing fingers 62 that are connected to a distal end of the stem 60 and that are tapered or angled relative to the stem 60 such that ends 64 of the fingers 62 are spaced apart from and unattached to the stem 60 by a gap such that the fingers 62 and stem portion 60 form a W-shape. This allows the ends 64 of the fingers 62 to collapse inwardly toward the stem 60 during insertion through the openings 34 in the body structure 12, and then subsequently expand or snap back after insertion to prevent removal of the clip body 18 from the vehicle body structure 12.

The subject invention provides a double sided W-clip 16 that is used to attach a body panel or fascia 14 to a vehicle body 12. The W-clip 16 is first installed onto the body 12 via one or more W-clips 32 and then the panel or fascia 14 is stretched over and attached onto the same clip body 18 via a locator pin 26 and at least one additional W-clip 24 that faces opposite of the other W-clips 32. The clip 16 is attached to the vehicle body 12 with the water sealing feature 40 already included to ensure a tight water seal completely along the body 12. The clip 16 also ensures that there is a sufficient retention force and the clip 16 can be used in small and tight packaging configurations. Additionally, the subject invention eliminates any possible operator error during assembly as the clip 16 is first installed to the body 12 via W-clips 32 with the fascia 14 subsequently being located via the pin 26 and clipped over an opposing W-clip 24.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a clip body having a vehicle side and a panel side;
   at least one first clip on the vehicle side;
   at least one locator pin on the panel side to locate a panel relative to a vehicle structure;
   at least one second clip on the panel side; and
   a seal on the vehicle side.

2. The apparatus of claim 1, wherein the at least one first clip comprises at least a pair of first clips that are spaced apart from each other along the clip body such that each first clip is configured to be received within a different mounting hole in the vehicle structure.

3. The apparatus of claim 2, wherein the clip body, the pair of first clips, the second clip, and the locator pin are formed as a single-piece component.

4. The apparatus of claim 3, wherein the seal comprises a layer of foam positioned between the vehicle side of the clip body and a vehicle body structure configured to be attached to the first clip.

5. The apparatus of claim 2, wherein the seal surrounds bases of the first clips.

6. An apparatus, comprising:
a clip body having a vehicle side and a panel side;
at least one first clip on the vehicle side, wherein the at least one first clip comprises at least a pair of W-clips;
at least one second clip on the panel side; and
a seal on the vehicle side.

7. The apparatus of claim 6, wherein the at least one second clip comprises a W-clip.

8. The apparatus of claim 1, wherein the clip body comprises a flat plate with the first clip extending outwardly of the vehicle side and the second clip extending outwardly of the panel side and in alignment with the first clip.

9. An apparatus, comprising:
a vehicle body structure;
a panel to be attached to the vehicle body structure, the panel including a locator opening; and
at least one connector to attach the panel to the vehicle body structure, the connector comprising
a clip body having a vehicle side and a panel side;
at least one first clip extending from the vehicle side;
at least one second clip extending from the panel side;
a locator pin extending from the panel side to be received within the locator opening to locate the panel relative to the vehicle body structure; and
a seal on the vehicle side.

10. The apparatus of claim 9, wherein the clip body comprises a flat plate and the first and second clips comprise W-clips.

11. The apparatus of claim 9, wherein the vehicle body structure includes first and second clip openings that are spaced apart from each other, and wherein the at least one first clip comprises at least a pair of first clips where one of the first clips is received within the first clip opening and the other of the first clips is received within the second clip opening.

12. The apparatus of claim 9, wherein the seal comprises a layer of foam that surrounds bases of the first clips.

13. The apparatus of claim 9, wherein each of the first and second clips have at least a pair of opposing fingers that collapse during insertion through corresponding holes in the vehicle body structure and panel, and expand after insertion to prevent removal of the panel from the vehicle body structure.

14. A method comprising:
(a) providing a clip body having at least a pair of first clips on a first side, a second clip on a second side, and a seal on the first side;
(b) attaching one of the first clips to a first opening in a vehicle body and the other of the first clips to a second opening in the vehicle body; and
(c) subsequently attaching a panel to the second clip such that the seal is positioned between the clip body and the vehicle body.

15. The method of claim 14, wherein the at least one first clip comprises a least a pair of first clips, and including inserting the pair of first clips through corresponding openings in the vehicle body during step (b).

16. A method comprising:
(a) providing a clip body having at least one first clip on a first side, a second clip on a second side, and a seal on the first side;
(b) attaching the first clip to a vehicle body; and
(c) subsequently attaching a panel to the second clip such that the seal is positioned between the clip body and the vehicle body, and wherein the clip body includes a locating pin on the second side, and including inserting the locator pin through a locating opening in the panel during step (c).

17. The method of claim 16, including providing the seal as a layer of foam that surrounds bases of the first clips.

18. The method of claim 14, including molding the clip body and the first and second clips as a single-piece component.

19. The apparatus of claim 8, wherein the at least one first clip comprises an additional first clip that extends outwardly of the vehicle side and which is in alignment with the locator pin.

20. The apparatus of claim 9, wherein the at least one first clip comprises at least a pair of W-clips.

21. The apparatus of claim 6, including at least one locator pin on the panel side to locate a panel relative to a vehicle structure, and wherein the locator pin is in alignment with one W-clip of the pair of W-clips and the other W-clip of the pair of W-clips is in alignment with the at least one second clip, and wherein the at least one locator pin has an outermost dimension that corresponds to a locator opening in the panel such that the panel can be located relative to the vehicle structure.

22. The method of claim 14, including using at least one locator pin on the second side to locate the panel relative to the vehicle body, and wherein the locator pin is in alignment with one first clip of the pair of first clips and the other first clip of the pair of first clips is in alignment with the second clip, and wherein the at least one locator pin has an outermost dimension that corresponds to a locator opening in the panel such that the panel can be located relative to the vehicle body.

23. The method of claim 16, wherein the at least one locator pin has an outermost dimension that corresponds to the locator opening in the panel such that the panel can be located relative to the vehicle body.

24. The apparatus of claim 9, wherein the locator pin has an outermost dimension that corresponds to the locator opening in the panel such that the panel can be located relative to the vehicle body structure.

25. The apparatus of claim 1, wherein the at least one locator pin has an outermost dimension that corresponds to a locator opening in the panel such that the panel can be located relative to the vehicle structure.

* * * * *